Oct. 27, 1953 V. S. GOLEMON 2,656,976
CALCULATING MACHINE FUNCTION SELECTION MECHANISM
Filed July 7, 1949 6 Sheets-Sheet 1

INVENTOR.
VALIA S. GOLEMON
BY
ATTORNEY

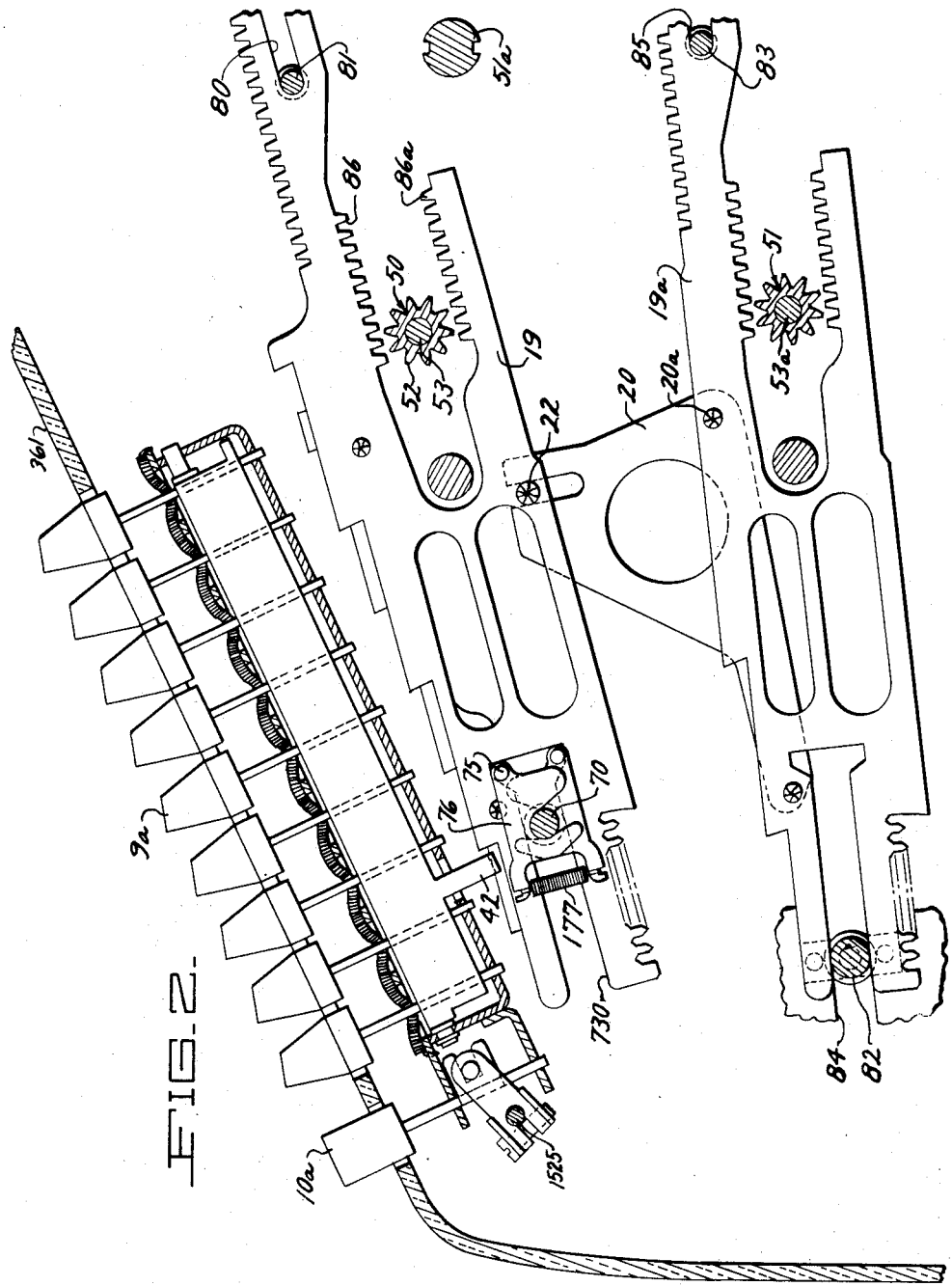

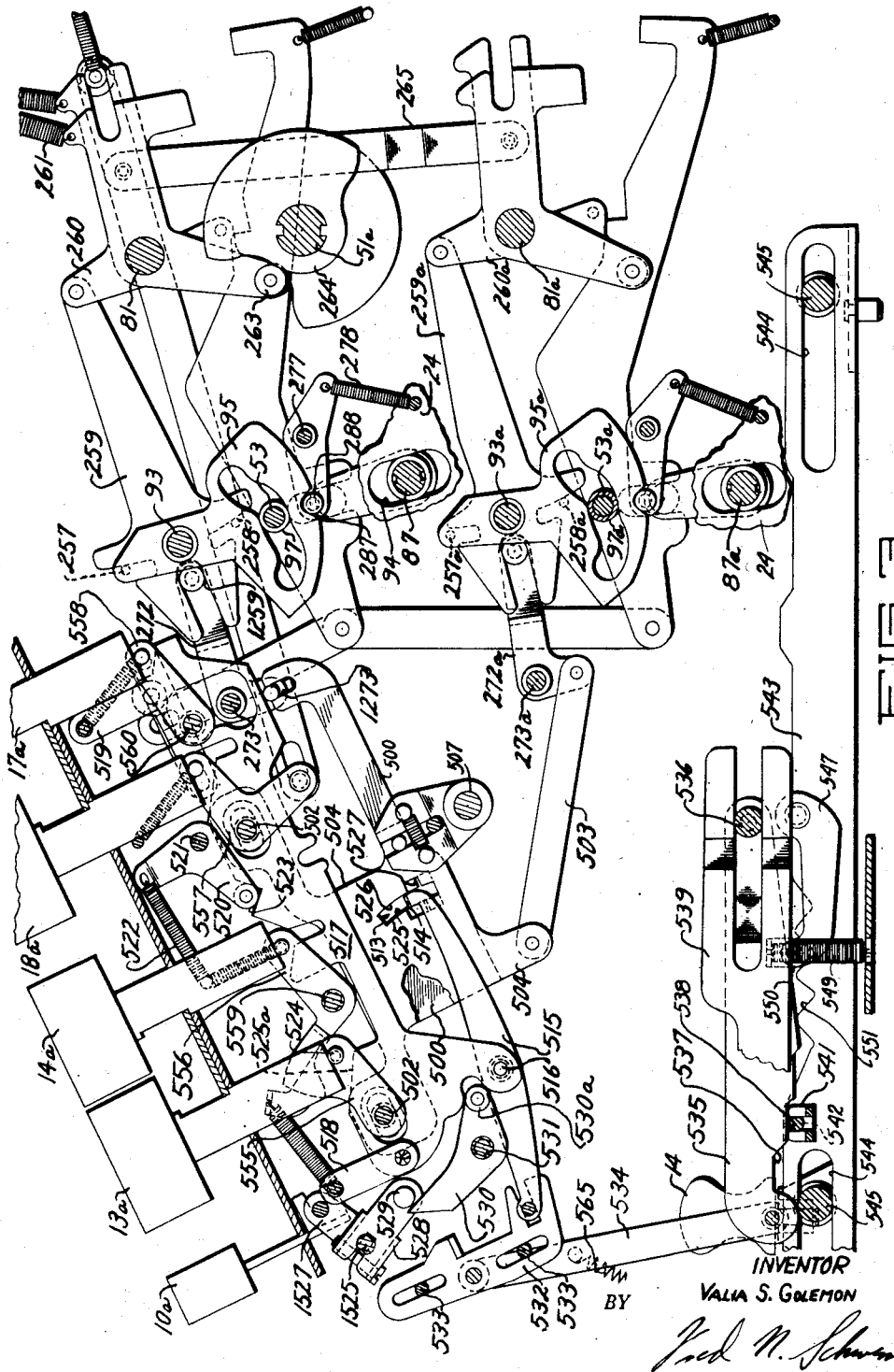

Oct. 27, 1953  V. S. GOLEMON  2,656,976
CALCULATING MACHINE FUNCTION SELECTION MECHANISM
Filed July 7, 1949   6 Sheets-Sheet 4
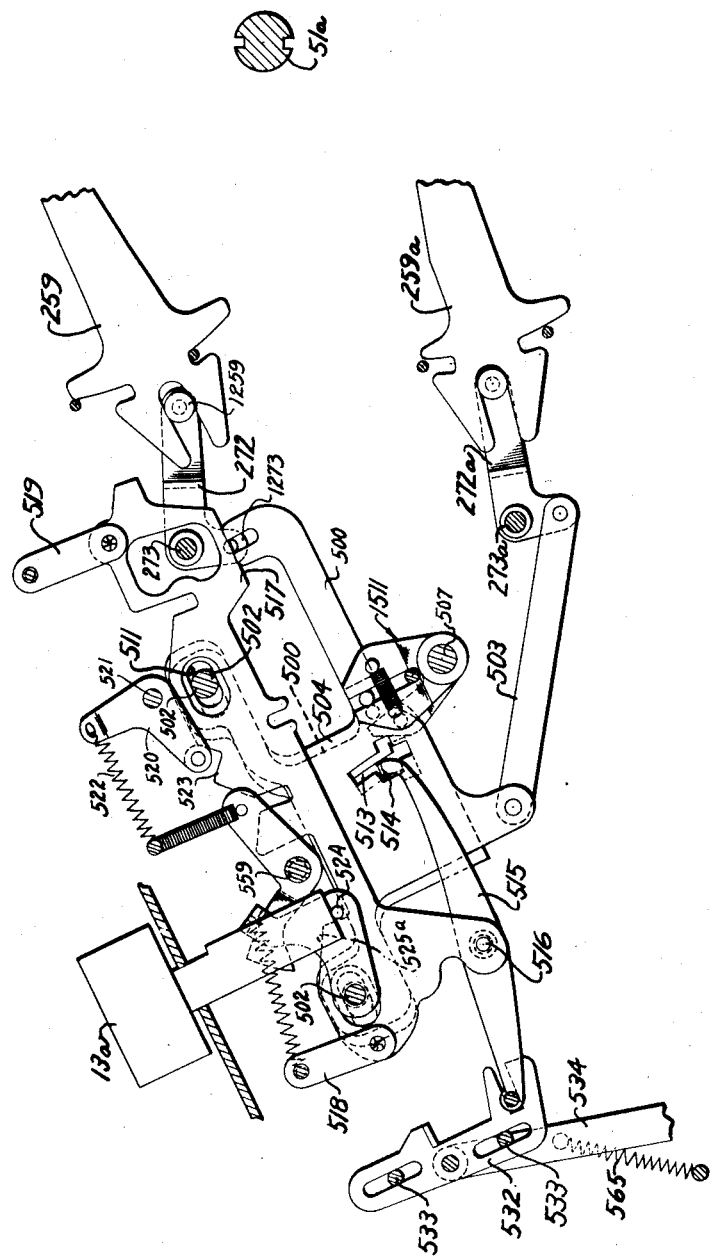
INVENTOR.
VALIA S. GOLEMON
BY
*Fred N. Schwend*
ATTORNEY

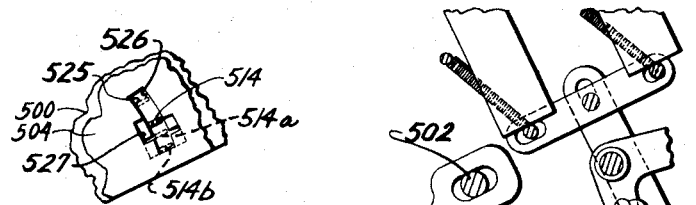
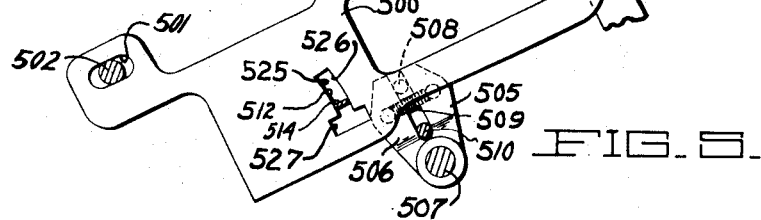
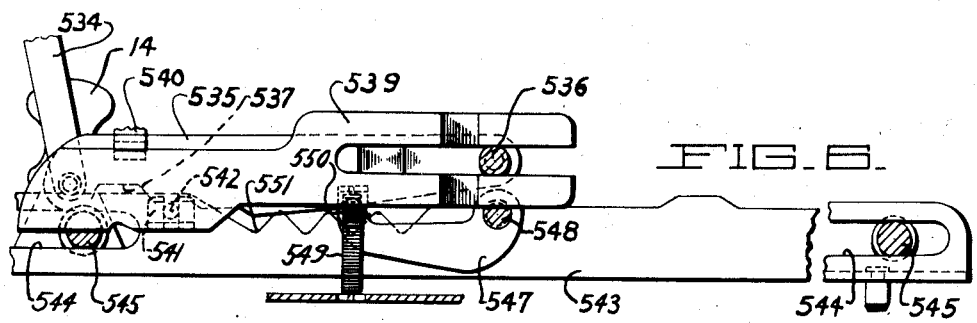
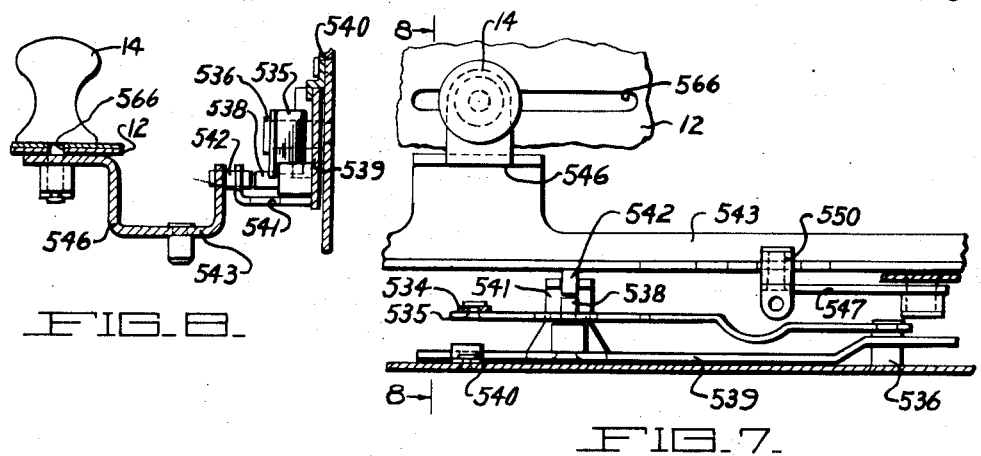

Oct. 27, 1953   V. S. GOLEMON   2,656,976
CALCULATING MACHINE FUNCTION SELECTION MECHANISM
Filed July 7, 1949   6 Sheets-Sheet 6

INVENTOR.
VALIA S. GOLEMON
BY
*Fred N. Schwend*
ATTORNEY

Patented Oct. 27, 1953

2,656,976

UNITED STATES PATENT OFFICE 2,656,976

CALCULATING MACHINE FUNCTION SELECTION MECHANISM

Valia S. Golemon, Burbank, Calif., assignor to Clary Multiplier Corporation, Los Angeles, Calif., a corporation of California Application July 7, 1949, Serial No. 103,468

11 Claims. (Cl. 235—60.31)

This invention relates to calculating and like machines having differential actuators and accumulators arranged to be reversely driven thereby, and has particular reference to machines having more than one accumulator and controls therefor, although certain salient features of the invention may be applied to the controls for a single accumulator.

One object of the invention is to pre-selectively determine operation of an accumulator upon depression of different control keys.

Another object of the invention is to provide controls for a multi-accumulator machine having provisions for pre-selectively determining entry of items into any one or all of the accumulators upon depression of an item entry control key.

Another object is to provide controls for a two-accumulator machine having provisions for selectively determining entry of items into one or the other or both accumulators.

Another object is to provide controls for a multi-accumulator machine having provisions for selectively effecting entry of items into any one or all of the accumulators upon depression of one item entry control key and for effecting entry of items into the same or other accumulators upon depression of another item entry control key.

Another object is to provide controls for a multi-accumulator machine having selectively pre-settable means for determining entry of items into any one or all of the accumulators and for totalling out of one accumulator only.

A further object is to provide a control mechanism of the aforementioned type which is of simple construction and readily changeable to effect different combinations of control functions.

The manner in which the above and other objects of the invention are accomplished will be readily understood on reference to the following specification when read in conjunction with the accompanying drawings, wherein:

Fig. 2 is a sectional elevation view through the machine illustrating the racks and the mechanism associated therewith.

Fig. 3 is a sectional elevation view through the controls for the machine and particularly the controls for the accumulators.

Fig. 4 is a sectional elevation view similar to that of Fig. 3 but with parts deleted and showing the controls set for a subtract operation.

Fig. 5 is a sectional elevation view showing particularly the control plate and linkage for controlling the upper accumulator.

Fig. 5A is a fragmentary sectional view illustrating the control plate slots and actuating element therefor.

Fig. 6 is a side elevation view of the settable controls for pre-selecting the mode of operation of the machine.

Fig. 7 is a plan view of the mechanism shown in Fig. 6.

Fig. 8 is a transverse sectional view taken along the line 8—8 of Fig. 7.

Figure 1:
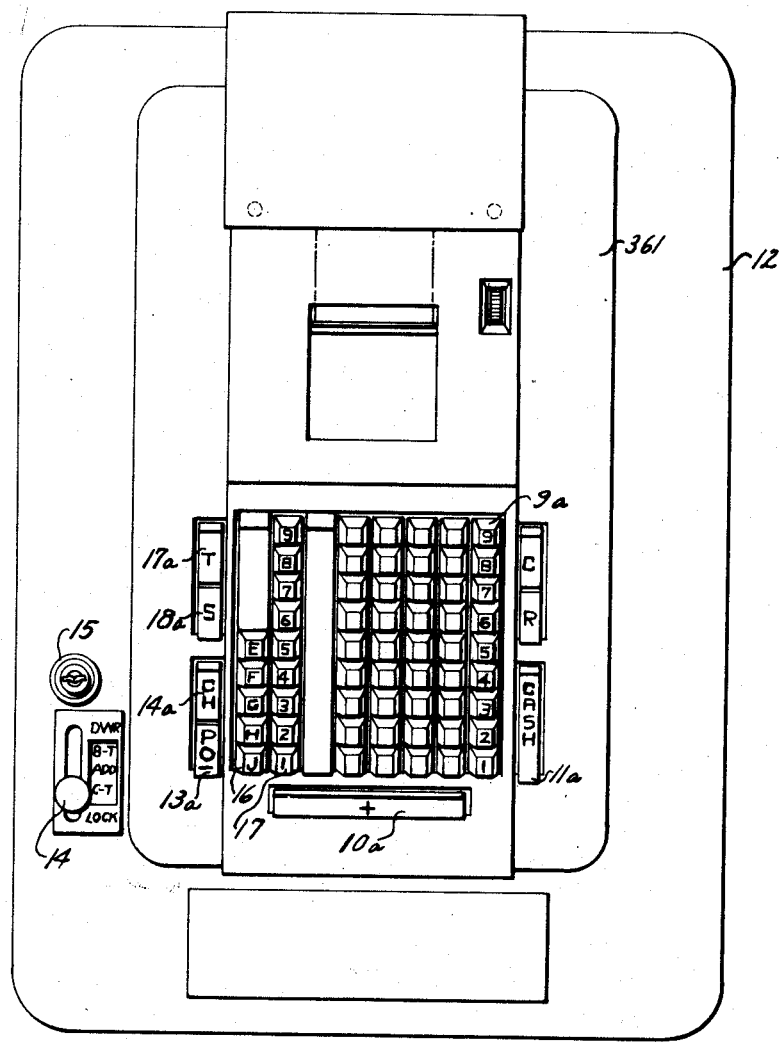
Fig. 1 is a plan view of a cash registering machine embodying the present invention.

The particular embodiment of the invention disclosed herein is applied to the well known and commercially available Clary cash registering machine disclosed and claimed in the copending application of Boyden et al., S. N. 38,294, filed July 12, 1948, now Patent No. 2,607,526. Various operating instrumentalities of the machine, particularly of the computing section, are disclosed and claimed in the copending applications of R. E. Boyden, S. N. 582,553, filed on March 13, 1945, now Patent No. 2,583,810, and of E. P. Drake, S. N. 582,554, also filed on March 13, 1945, the latter having matured into Patent No. 2,472,696, issued on June 7, 1949. It should be understood, however, that although the invention is disclosed as embodied in a cash registering machine, it may equally well be applied to other forms of adding and calculating machines of either the listing or the visible dial type.

The machine comprises, in general, a computing section enclosed by a cover 361 and a cash drawer section enclosed by a cover 12 underlying the computing section.

Amounts are entered into the machine through a keyboard comprising amount keys 9a. The two left-hand rows 16 and 17 of the amount keys are provided for designation purposes only and, therefore, amounts set therein are not accumulated.

The machine is of the duplex type containing two accumulators, generally indicated at 50 and 51 (Fig. 2).

Add bars 10a and 11a are provided to cause the machine to additively enter items set up on the keys 9a into one or the other or both of the accumulators, depending upon the presetting of a knob 14 which is adjustable into any of five different positions and adapted to be locked into any four thereof by a key actuated lock 15. A minus bar 13a is provided to cause the machine to subtract entered items entered in the keys 9a from a preselected accumulator. This bar acts as a "paid out" control bar when the machine is operated as a cash register. A non-add or charge bar 14a is provided to control printing only of items. Total and sub-total bars 17a and 18a, respectively, are provided to total or sub-total items from the accumulator when the machine is operated in certain conditions determined by setting of the knob 14.

As disclosed in the aforementioned R. E. Boyden application, S. N. 582,553, the computing mechanism is motor driven and includes a cyclically operable drive shaft 51a (Figs. 2, 3, 4 and 9) driven by a cyclic clutch (not shown) under control of the various depressible control bars, i. e., 10a, 11a, 13a, 14a, 17a and 18a. Depression of any such bar causes a cycle of operation of the machine, i. e., a complete rotation of the shaft 51a.

The shaft 51a is effective, as will be described presently, to mesh one or the other or both of the accumulators 50 and 51 with differentially operable racks 19 and 19a, respectively (Fig. 2). The shaft 51a is also effective to differentially advance the racks until arrested by depressed ones of the amount keys 9a and to release the cash drawer from "closed" position under different conditions controlled by the setting of the knob 14.

The upper racks 19 are guided for fore and aft movement by a movable shaft 79 and stationary shaft 81 extending through slots 739 and 80, respectively, formed in the racks. The lower racks 19a are similarly guided by stationary shafts 82 and 83 embraced by slots 84 and 85, respectively, in each rack. The racks 19 and 19a, in each order, are coupled together, so as to move fore and aft as a unit, by means of a plate 21 suitably secured by rivets 20a to the lower rack and provided with a pin and slot connection 22 with the upper rack.

For the purpose of differentially driving the various pairs of racks 19 and 19a, the shaft 79 is driven sideways, fore and aft of the machine, by a drive shaft 51a, through drive means (not shown), and is yieldably connected to each rack 19 by pairs of opposed drive elements 76 pivotally supported on the shaft 79 and each provided with a roller 75 which normally engages in a lateral depression formed at the closed end of the slot 739 in the respective rack. A spring 177 tensioned between the elements 76 urges them apart to normally hold the rollers 75 thereof in the depressions in the slot 739 until the respective rack is arrested by a zero stop 49 or by a depressed key 9a if such key has been depressed in the aligned row of keys. The aforementioned yieldable drive means is disclosed and claimed in the co-pending application of R. E. Boyden, S. N. 718,707, filed December 27, 1946, now Patent No. 2,490,200.

Each of the accumulators 50 and 51 comprises ordinally arranged accumulator gears 52 rotatably mounted on an accumulator shaft 53 (associated with the accumulator 50) and shaft 53a (associated with the accumulator 51) and arranged to mesh with either an upper rack gear section 86 or a lower rack gear section 86a on the respective rack, thereby to enter amounts in the accumulator either additively or subtractively.

As disclosed in detail in the aforementioned Drake Patent 2,472,696, each accumulator includes a second lower shaft 87 (associated with accumulator 50) and shaft 87a (associated with accumulator 51) which, together with its shaft 53 or 53a supports the accumulator as a unit for vertical positioning. Each shaft is guided at the opposite ends thereof by substantially vertical slots, one of which is shown at 94, formed in spaced machine side frames 24.

Referring to Fig. 3, the accumulator shaft 53 for the upper accumulator 50 has rollers on opposite ends thereof, one of which is shown at 97, and each is embraced by a cam groove formed in a box cam, one of which is shown at 95, pivoted on a frame stud 93. Suitable means (not shown) is provided to transfer movement from the cam 95 at one end of the shaft 53 to a like cam at the opposite end of the accumulator whereby to effect parallel vertical movement of the same. The accumulator is normally held in its neutral illustrated position wherein the gears 52 thereof are held out of mesh with both rack gear sections 86 and 86a of the associated racks, and for this purpose, the undersurface of the box cam 95 is provided with a V-shaped notch 287 normally engaged by a centralizer 288, fulcrumed at 277, and urged clockwise by a spring 278. However, counter-clockwise rocking of the cam 95 from its centralized position will lower the accumulator into mesh with the lower rack gear sections 86a of the associated racks to effect subtractive entries, while clockwise rocking thereof from its neutral position will raise the accumulator into its additive position in mesh with the upper rack gear section 86.

The cam 95 carries a pair of pins 257 and 258 spaced on opposite sides of the frame stud 93. These pins are adapted to be engaged by a hook member 259 connected to a three-armed cam follower 260 which is pivotally supported on the stationary shaft 81. The cam follower is urged counter-clockwise by a spring 261 to hold a roller 263 on another arm thereof against a cam 264 keyed on the drive shaft 51a. The latter cam 264 has a high portion extending substantially half-way around its periphery whereby to rock the cam follower 260 and thereby move the hook member 259 rearward and hold it in such rearward position during approximately the first half of the machine cycle. If, during such movement, the hook member 259 is maintained in its neutral illustrated position, it will be ineffective to rock the box cam 95 and the accumulator will therefore be maintained in its neutral position. However, if the hook member is held in a raised or lowered position during its rearward movement, wherein it embraces the upper pin 257 or the lower pin 258, it will be effective to rock the box cam 95 clockwise or counter-clockwise, respectively and thus raise or lower the accumulator.

The lower accumulator is actuated into an upper or lower position in precisely the same manner as is the upper accumulator, and for this purpose, the accumulator shaft 53a of the lower accumulator is arranged to be actuated by a box cam 95a pivoted at 93a and provided with pins 257a and 258a. A hooked member 259a is operatively associated with the pins 257a and 258a and is connected to a three-armed lever 260a pivoted at 81a. The latter lever is connected to the upper lever 260 by a link 265 whereby actuation of the arm 260 by cam 264 will transmit like rearward movements to the two hooked members 259 and 259a.

Means are provided for pre-selectively controlling entry of amounts, either additively or subtractively, into either or both accumulators under control of the settable knob 14. For this purpose, the upper hook 259 is connected through a pin and slot connection 1259 to a bellcrank 272, pivoted at 273, and connected through a second pin and slot connection 1273 to the forward extension of a control plate 500 (Figs. 3, 4 and 5). The plate is provided with slots 501 embracing stationary guide studs 502 for guiding the plate fore and aft.

The plate 500, and consequently the associated hook member 259, is normally yieldably held in a central or neutral position by a centralizer comprising opposed arms 505 and 506 (Fig. 5), independently pivoted on a frame stud 507 and urged against opposite sides of a pin 508 on the control plate 500 by a spring 509 tensioned between the two arms. The arms 505 and 506 also normally embrace the opposite sides of a stationary frame pin 510 and thus normally maintain the plate 500 in a neutral position.

The lower hook member 259a is connected through a pin and slot connection to a bellcrank 272a, pivoted at 273a, and connected through a link 503 to a second control plate 504 lying in juxtaposition with the plate 500 and provided with guide slots 511 embracing the aforementioned guide studs 502. The plate 504 and its associated hook member 259a are normally held in their neutral positions independently of the plate 500 by a centralizer, generally indicated at 1511, similar to that above described for the plate 500.

The control plates 500 and 504 are provided with irregular shaped slots 512 and 513, respectively, into both of which extend the ear 514 of an actuating lever 515. The latter is pivotally connected at 516 to a cam bar 517 (Figs. 3 and 4) supported for fore and aft movement by swinging links 518 and 519, the bar thus forming a carrier for the lever 515.

The cam bar 517 is normally yieldably held in its illustrated centralized position shown in Fig. 3 by a centralizer 520 which is pivoted at 521 and urged by a spring 522 into a V-shaped centralizing notch 523 formed in the upper edge of the cam bar 517. The latter is also provided with camming surfaces, one of which is shown at 525a, on the upper edge thereof which underlie and are arranged to be cammed by pins 524 carried by levers 555, 556, 557 and 558. Levers 555 and 557 are pivoted on the studs 502 while the levers 556 and 558 are pivoted at 559 and 560, respectively. The pins 524 underlie the stems of the different control bars 13a, 14a, 17a and 18a and are thus lowered upon depression of the associated control bars.

The upper camming surfaces of the bar 517 are so formed that depression of the minus bar 13a, the total bar 17a or the sub-total bar 18a will cam the latter forwardly, as indicated in Fig. 4, to cause the actuating member 515 to move one or the other of the plates 500 and 504, depending upon the position of the ear 514 along slots 512 and 513 of the control plates 500 and 504, respectively, as will be described presently.

Depression of the charge bar 14a will be ineffective, when the bar 517 is in its normal centralized position, to cam the same in either direction and thus neither accumulator will be conditioned for entry of items therein.

The add bar 10a, upon depression, rocks clockwise a shaft assembly including arm 1527 (to which the add bar is connected), a shaft 1525, and an arm 528. The latter arm 528 is provided with a stud 529 which transmits a counter-clockwise rocking movement to a camming lever 530, pivoted at 531, to cause a roller 530a thereon to cam the bar 517 rearwardly, causing the actuating member 515 to likewise move rearwardly and, depending upon the angular position thereof, to move one or the other or both of the control plates 500 and 504 rearwardly so as to position the respective hook member or members in an upper or addition conditioning position.

As mentioned hereinbefore, the slots 512 and 513 of the plate members 500 and 504, respectively, are irregular. These slots each comprise arcuate working surfaces 525 and 526 extending substantially concentric with the pivotal support 516 for the actuating member 515 when the parts are in their centralized positions. When the ear 514 is aligned with one or the other of such working surfaces it will be effective, upon actuation of the bar 517 and member 515, to actuate the associated plate. However, when the ear 514 is in alignment with a cut-out portion or non-working surface 527, it will be ineffective to actuate the associated control plate and thus will be ineffective to move the respective hook out of its neutral or non-adding position.

Means are provided for setting the control lever 515 into different angular positions whereby to locate the ear 514 in or out of line with different working and non-working portions of the control plates 500 and 504. For this purpose, the lever 515 is connected to the aforementioned settable knob 14 (Figs. 1, 3, 6, 7 and 8) through the following linkage. The forward end of the actuating member 515 is coupled through a pin and slot connection with a slide 532 having vertical slots therein embracing stationary guide pins 533. The latter slide is connected by a link 534 to a cam lever 535 and is urged downwardly by a spring 565 tensioned between the link and a portion of the machine frame. The lever 535 is pivoted on a frame stud 536 and is provided with stepped camming surfaces 537 on its under edge. The latter surfaces overlie a camming pin 538 mounted on a slide 539. The latter has a slot formed therein adjacent its rear end which slidably embraces the stud 536, while its forward end is slidably supported by guide clips 540. The slide 539 has a U-shaped bifurcated extension 541 which embraces a pin 542 on a slide 543. The latter is provided with elongated guide slots 544 at its opposite ends embracing stationary guide studs 545, to enable fore and aft movement thereof. The control knob 14 is suitably secured to an extension 546 of the slide 543 and protrudes through a slot 566 in the cash drawer casing 12 permitting manual setting of the latter into any four positions and movement thereof into any of five positions.

From the foregoing it will be seen that as the slide 543 is moved lengthwise by manipulation of the knob 14, the slide 539 will likewise be moved and the camming pin 538 will move along the stepped camming surface 537 of lever 535, rocking the latter into different angular positions which, through link 534 and slide 532, likewise rocks the actuating member 515.

The slide 543, and consequently the actuating member 515 is centralized in any of four positions by a centralizer 547, pivoted at 548, and urged downward by a spring 549 tensioned between the lever and a suitable part of the frame to urge a roller 550 on the lever into engagement with one of four spaced V-shaped centralizing notches 551 on the slide.

The knob 14 is illustrated throughout the drawings as being positioned in its "C-T" or "customer total" position wherein the ear 514 of the actuating member 515 is located in alignment with the rear working surfaces 526 of the slots in both of the control plates 500 and 504 and wherein the ear is in alignment with the forward working surface 525 of the slot of plate 500 only, a cut-out portion or non-working surface 527 being formed in the forward working surface of the slot in plate 504 in this position of the ear. Thus, for example, upon depression of the minus bar 13a, with the knob 14 in its "C-T" position, the parts will assume their positions illustrated in Fig. 4. That is, the actuating member 515 will move the plate 500 forward to position the upper hook member 259 in subtract control position but will be ineffective to move the plate 504 out of its centralized position, leaving hook member 259a in its neutral position. Therefore, any amount entered into the keyboard will be subtracted out of the upper accumulator only. Depression of the total bar 17a or the sub-total bar 18a will likewise cause the bar 517, actuating member 515, and controls effected thereby to assume their positions shown in Fig. 4, to enable totalling or sub-totalling out the upper accumulator only. On the other hand, however, if the add bar 10a is depressed, the ear 514 of the actuating member 515, being in alignment with both rear working surfaces 526, will move both control plates rearward and thus set both hook members 259 and 259a in their upper addition control positions to effect entry of items additively into both accumulators.

Setting of the knob 14 one position rearward into its "add" position will, through the aforementioned linkage, position the ear 514 into its next lower position shown by the dot and dash lines 514a (Fig. 5A) wherein it will be located in forward and rear non-working zones of the slot in the plate 504 so that it will be effective to actuate the plate 500 only, and it will be capable of actuating said plate in either an additive or subtractive direction to additively or subtractively enter items into the upper accumulator. That is, only the upper accumulator will become effective.

Movement of the knob 14 into its "B-T" or "grand total" position will locate the ear 514 into its lowermost position shown by the dot and dash lines 514b in Fig. 5A wherein it will be located between the working surfaces of the slot in plate 504 and in the non-working zones on either side of the slot in plate 500. Consequently, with the knob in its "B-T" position, amounts can only be entered into or totalled out of the lower accumulator.

As mentioned hereinbefore, the present machine is of the cash register type and the settable knob 14, in addition to pre-selecting the different accumulators, is also effective to control the cash drawer, to accommodate different conditions of use to which the machine may be put.

Figure 9:
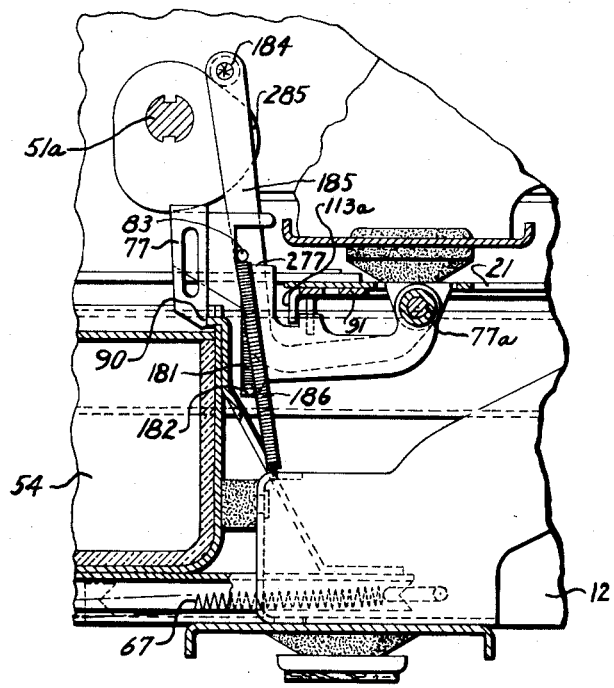
Fig. 9 is a sectional elevation view through the rear portion of the machine illustrating the cash drawer control mechanism.
Figure 10:
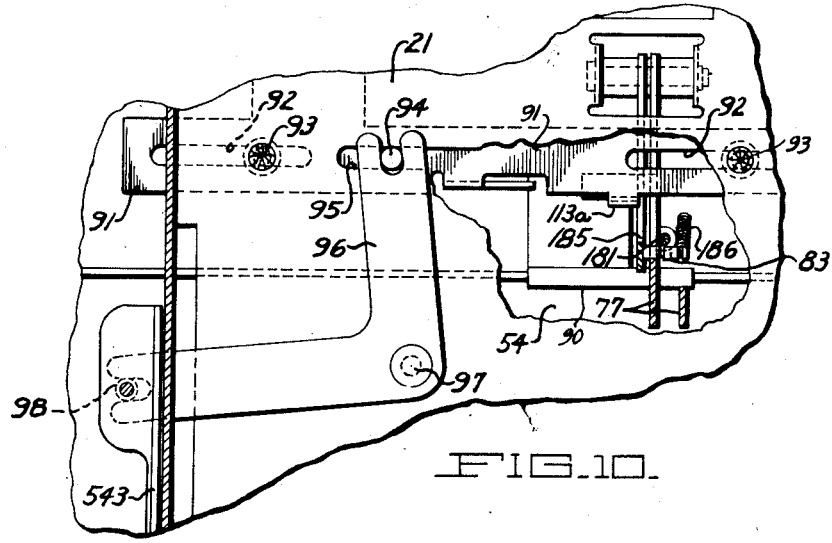
Fig. 10 is a plan view, with parts broken away, illustrating the cash drawer control mechanism of Fig. 9.

The drawer as disclosed in detail in the aforementioned Boyden et al. application, S. N. 38,294, and as partially illustrated at 54 in Figs. 9 and 10, is suitably mounted in the cash drawer casing 12 for movement to and fro man "open" position.

A spring 67 is tensioned between the rear end of the drawer and a part of the frame to urge the drawer toward its open position. However, the drawer is normally held in its illustrated closed position by a latch 77 pivotally supported at 77a on the bracket portions depending from a bottom plate 21 forming the base of the computing section of the machine. The latch is normally held in its latching position by a spring 186 extending between the machine frame and a stud 83 carried by cam follower 185, the stud extending over a shoulder 277 on the latch. The spring is thus effective to normally hold the latch 77 and the cam follower 185 in their lowermost illustrated position. Cam follower 185 is also pivoted at 77a independently of the latch 77 and is provided with a roller 184 held in contact with a drawer release cam 285 keyed to the aforementioned drive shaft 51a. A second spring 181 is tensioned between an ear 182 on the latch 77 and the stud 83 whereby to normally hold the latch in its illustrated position relative to the cam follower 185, with the shoulder 277 in contact with the underside of stud 83.

From the above it will be seen that in such cases where the latch 77 is not blocked by other means which will be described presently, operation of the machine and consequent rotation of the cam 285 will rock the cam follower 185 clockwise and, through the spring 181, likewise rock the latch 77 to release the tip thereof from latching engagement with a strike edge 90 on the drawer 54.

In some instances it is desirable to maintain the drawer in closed condition throughout a machine operation, such as when using the machine as an adding machine for adding or subtracting items without cash transactions. For this purpose, means under control of the settable knob 14 are provided to block release of the latch 77 by cam 285. A cross slide 91 is provided having elongated slots 92 embracing, and slidable along, guide studs 93 fixed to the bottom plate 21. The slide 91 is provided with a pin 94 extending upwardly through a slot 95 in the plate 21. The pin is fitted within a slot in a bell-crank 96, pivoted at 97, and coupled by means of pin and slot connection 98 to the aforementioned settable slide 543, and is thus movable thereby.

A blocking lug 113a extends downward from the cross-slide 91 and is so located that when the knob 14 is in its illustrated "C-T" position the lug will be located to the left (as viewed in Fig. 10) of a position overlying the drawer latch 77. However, upon movement of the knob to its "add" position wherein the machine is to be used solely for the purpose of adding and subtracting items, the lug 113a will be positioned over the latch 77 so that during ensuing operations of the machine, the latter will be blocked and the spring 181 will merely yield as the cam follower 185 is actuated by its cam 285.

Upon movement of the knob 14 to its "B-T" or grand total position, the blocking lug 113a will be moved to the right (as viewed in Fig. 10) of the latch 77 so that the cash drawer may also be automatically released.

In using the machine for cash transaction purposes, the proprietor or cashier preferably sets the knob 14 into its "C-T" position. The value of each item being sold is preferably separately entered into the keyboard and the add bar depressed after each entry, causing the values of the separate items to be entered into both accumulators. At the end of a particular transaction, the total bar 17a is depressed, obtaining the total of the transaction, it being recalled that the upper accumulator will be totalled, leaving the grand total of all transactions accumulated in the lower accumulator. Sub-totals of the amount in the upper accumulator may, of course, be obtained at any time by depressing the sub-total bar 18a.

At such times as it is desired or necessary to determine the total receipts for a particular period of time during which the machine has been operating, the knob 14 is set to its "B-T" position in which only the lower accumulator will be rendered active and the upper accumulator will remain inactive. In this condition, depression of the total bar will accordingly effect totalling of the lower accumulator only to obtain the grand total. Also, any additions or subtractions made while the knob is in its "B-T" position will be entered into the lower accumulator, leaving the upper accumulator undisturbed.

In using the machine for adding or subtracting purposes only, the knob 14 is set to its add position in which it will be recalled that the cash drawer will be locked in its closed condition. The machine may then be operated in the usual manner of an adding machine and the items entered on the keyboard thereof will be added or subtracted in the upper accumulator only. Thus, the machine may be operated between periods of cash transactions, without disturbing any grand total entered into the lower accumulator.

Various other modes of operating the machine may also be followed by proper setting of the knob 14 and manipulation of the control bars. For example, two separate sets of values may be separately entered into and totalled from the two accumulators, setting the knob 14 into its "add" position to render only the upper accumulator active, and setting the knob into its "B-T" position to render only the lower accumulator active.

It will also be seen from the foregoing description that various combinations of accumulator selection conditions may be readily obtained by substituting other control plates for the control plates 500 and 504, such plates having cut-out portions 527 positioned in different locations along the respective control slots, or the control plates 500 and 504 may be revised by filing or otherwise forming new cut-out portions in different desired positions along the respective slots and filling in the old cut-out portions 527.

Further, it will become obvious that additional accumulators can easily be added with respective additional control plates associated therewith and in juxtaposition with the plates 500 and 504, and all arranged to be actuated by the ear 514 of actuating member 515.

Having thus described the invention, what I desire to secure by U. S. Letters Patent is:

1. In a calculating machine having two accumulators and differential actuators therefor; the combination comprising an actuating element movable in a predetermined direction, means for operatively connecting one of said accumulators to said actuators including a control element movable in said predetermined direction; means for operatively connecting the other of said accumulators to said actuators including a second control element movable in said predetermined direction; each of said control elements having a surface arranged to be actuated by said actuating element during movement of said actuating element in said predetermined direction to cause operative connection of its respective accumulator to said actuators, selectively settable means for setting said actuating element transversely of said direction into any of different paths in line with the surfaces of both of said elements or out of line with the surface of either of said elements, and means other than said last-mentioned means for moving said actuating element through a selected one of said paths.

2. In a calculating machine having two accumulators and differential actuators therefor; the combination comprising an actuating element movable in a predetermined direction, manually operable means for causing operation of said machine including means for actuating said element in said predetermined direction; means for operatively connecting one of said accumulators to said actuators including a control element movable in said predetermined direction; means for operatively connecting the other of said accumulators to said actuators including a second control element movable in said predetermined direction; each of said control elements having a surface arranged to be actuated by said actuating element during movement of said actuating element in said predetermined direction to cause operative connection of its respective accumulator to said actuators, and manually settable means for selectively setting said actuating element transversely of said direction into any of different paths extending parallel to said predetermined direction and in line with the surfaces of both of said elements or out of line with the surface of either of said elements.

3. In a calculating machine having two accumulators and differential actuators therefor; the combination comprising a carrier movable in a substantially linear path, means for causing operation of said machine including means for moving said carrier, an actuating element, means on said carrier pivotally supporting said actuating element, means for operatively connecting one of said accumulators to said actuators including a control element movable parallel to said linear path; means for operatively connecting the other of said accumulators to said actuators including a second control element movable parallel to said linear path and located in juxtaposition to said first mentioned control element; each of said control elements having surfaces arranged to be actuated by said actuating element during movement thereof by said carrier to cause operative connection of its respective accumulator to said actuators, and means other than said carrier moving means for selectively setting said actuating element in different positions about said pivotal support whereby to maintain said actuating element either in line with different ones of said surfaces or out of line therewith during movement of said actuating element by said carrier.

4. In a calculating machine having two reversible accumulators and differential actuators adapted to drive said accumulators in either of opposite directions; the combination comprising means for operatively connecting one of said accumulators to said actuators in either of two relations whereby to drive said accumulator in either of opposite directions, said last mentioned means comprising a plate movable edgewise in one direction to control connection of said accumulator in one of said relations and movable in the opposite direction to control connection of said accumulator in the other of said relations; means for operatively connecting the other of said accumulators to said actuators in either of two relations whereby to drive said other accumulator in either of opposite directions, said last mentioned means comprising a second plate movable edgewise in one direction to control connection of said other accumulator in one of said relations thereof and movable in the other direction to control connection of said other accumulator in the other of said relations thereof; each of said plates having a slot therein extending substantially at right angles to the direction of movement thereof, said slots having relieved portions at different positions along the length thereof, an actuating element movable in both of said slots, manually operable means for causing operation of said machine including means for moving said actuating element in either of said directions of movement of said plates; said actuating element being ineffective to actuate a said plate when in line with a said relieved portion thereof, and selectively settable means other than said manually operable means for positioning said actuating member in different positions along said slots.

5. In a calculating machine having a reversible accumulator and differential actuators therefor; the combination comprising means including a control element movable in either of opposite directions for operatively connecting said accumulator to said actuators in either of two relations whereby to cause said actuators to drive said accumulator in either of opposite directions, respectively; a slot in said element extending substantially at right angles to the direction of movement thereof, an actuating element engageable in said slot, means for causing operation of said machine including means for moving said actuating element in either of opposite directions parallel to said directions of movement of said control element whereby to move said control element accordingly; said slot having cut-out portions on opposite sides thereof, and means other than said moving means for selectively setting said actuating element into different positions along said slot and into and out of alignment with said cut-out portions, said actuating element being ineffective to move said control element when said actuating element is moved into a said cut-out portion.

6. In a calculating machine having a reversible accumulator and differential actuators therefor; the combination comprising means including a control element movable in either of opposite directions from a neutral position for operatively connecting said accumulator to said actuators in either of two relations whereby to cause said actuators to drive said accumulator in either of opposite directions, respectively; means for normally maintaining said element in said neutral position, a slot in said element extending at substantially right angles to the direction of movement thereof, an actuating element engageable in said slot, manually controllable means for causing operation of said machine including means for moving said actuating element in either of opposite directions parallel to said directions of movement of said control element from a neutral position whereby to move said control element accordingly; means for normally maintaining said actuating element in said neutral position thereof, said slot having cut-out portions on opposite sides thereof, and means other than said moving means for selectively setting said actuating element into different positions along said slot and into and out of alignment with said cut-out portions, said actuating element being ineffective to move said control element when said actuating element is moved into a said cut-out portion.

7. In a calculating machine having two reversible accumulators and differential actuators adapted to drive said accumulators in either of opposite directions; the combination comprising means for operatively connecting one of said accumulators to said actuators in either of two relations whereby to drive said accumulator in either of opposite directions, said last-mentioned means including a plate movable edgewise in one direction to control connection of said accumulator in one of said relations and movable in the opposite direction to control connection of said accumulator in the other of said relations; means for operatively connecting the other of said accumulators to said actuators in either of two relations whereby to drive said other accumulator in either of opposite directions, said last-mentioned means comprising a control plate movable edgewise in one of said directions of movement of said first-mentioned control plate to control connection of said other accumulator in one of said relations thereof and movable in the opposite direction to control connection of said other accumulator in the other of said relations thereof; each of said plates having a slot therein extending at right angles to the direction of movement thereof, said slots having relieved portions at different positions along the length thereof, an actuating element movable in both of said slots, means for effecting item entry operations including a device for moving said actuating element in one of said directions of movement of said plates; means for effecting total taking operations including a device for moving said actuating element in the other of said directions of movement of said plates; said actuating element being ineffective to actuate a said plate when in line with a said relieved portion thereof, and selectively settable means other than said aforementioned means for positioning said actuating element in different positions along said slots.

8. In a calculating machine having two reversible accumulators and differential actuators adapted to drive said accumulators in either of opposite directions; the combination comprising means for operatively connecting one of said accumulators to said actuators in either of two relations whereby to drive said accumulator in either of opposite directions, said last-mentioned means including a plate movable edgewise in one direction from a neutral position to control connection of said accumulator in one of said relations and movable in the opposite direction from said neutral position to control connection of said accumulator in the other of said relations; means for operatively connecting the other of said accumulators to said actuators in either of two relations whereby to drive said other accumulator in either of opposite directions, said last-mentioned means including a second plate movable edgewise in one of said directions of movement of said first-mentioned plate and from a neutral position to control connection of said other accumulator in one of said relations thereof and movable in the opposite direction from said last-mentioned neutral position to control connection of said other accumulator in the other of said relations thereof; each of said plates having a slot therein extending substantially at right angles to the direction of movement thereof, said slots having relieved portions at different positions along the length thereof, means for yieldably maintaining said plates in their respective neutral positions, an actuating element movable in both of said slots, manually operable means for causing operation of said machine including means for selectively moving said actuating element in either of said directions of movement of said plates; said actuating element being ineffective to actuate a said plate when in line with a said relieved portion thereof, and selectively settable means other than said manually operable means for positioning said actuating element in different positions along said slots.

9. In a calculating machine having two reversible accumulators and differential actuators adapted to drive said accumulators in either of opposite directions; the combination comprising means for operatively connecting one of said accumulators to said actuators in either of two relations whereby to drive said accumulator in either of opposite directions, said last-mentioned means including a plate movable edgewise in one direction from a neutral position to control connection of said accumulator in one of said relations and movable in the opposite direction from said neutral position to control connection of said accumulator in the other of said relations; means for operatively connecting the other of said accumulators to said actuators in either of two relations whereby to drive said other accumulator in either of opposite directions, said last-mentioned means including a second plate movable edgewise in one of said directions of movement of said first-mentioned plate and from a neutral position to control connection of said other accumulator in one of said relations thereof and movable in the opposite direction from said last-mentioned neutral position to control connection of said other accumulator in the other of said relations thereof; each of said plates having a slot therein extending substantially at right angles to the direction of movement thereof, said slots having relieved portions at different positions along the length thereof, means for yieldably maintaining said plates in their respective neutral positions, an actuating element movable in both of said slots, means for effecting item entry operations including a device for moving said actuating element in one of said directions of movement of said plates; means for effecting total taking operations including a device for moving said actuating element in the other of said directions of movement of said plates, said actuating element being ineffective to actuate said plate when in line with a said relieved portion thereof, and selectively settable means other than said aforementioned means for positioning said actuating element in different positions along said slots.

10. In a calculating machine having two reversible accumulators and differential actuators adapted to drive said accumulator in either of opposite directions; the combination comprising means for operatively connecting one of said accumulators to said actuators in either of two relations whereby to drive said accumulator in either of opposite directions, said last mentioned means including a plate movable edgewise in one direction from a neutral position to control connection of said accumulator in one of said relations and movable in the opposite directions from said neutral position to control connection of said accumulator in the other of said relations; means for operatively connecting the other of said accumulators to said actuators in either of two relations whereby to drive said other accumulator in either of opposite directions, said last mentioned means including a second plate movable edgewise in one of said directions of movement of said first-mentioned plate and from a neutral position to control connection of said other accumulator in one of said relations thereof and movable in the opposite direction from said last mentioned neutral position to control connection of said other accumulator in the other of said relations thereof; each of said plates having a slot therein extending substantially at right angles to the direction of movement thereof, said slots having relieved portions at different positions along the length thereof, means for yieldably maintaining said plates in their respective neutral positions, an actuating element movable in both of said slots, means for yieldably maintaining said actuating element in a neutral position wherein the latter may freely move along said slots at right angles to said directions of movement of said plates, manually operable means for causing operation of said machine including means for selectively moving said actuating element from said neutral position and in one or the other of said directions of movement of said plates, said actuating element being ineffective to actuate a said plate when in line with said relieved portions thereof, and selectively settable means other than said aforementioned means for positioning said actuating element in different positions along said slot.

11. In a calculating machine having two reversible accumulators and differential actuators adapted to drive said accumulator in either of opposite directions; the combination comprising means for operatively connecting one of said accumulators to said actuators in either of two relations whereby to drive said accumulator in either of opposite directions, said last-mentioned means including a plate movable edgewise in one direction from a neutral position to control connection of said accumulator in one of said relations and movable in the opposite direction from said neutral position to control connection of said accumulator in the other of said relations; means for operatively connecting the other of said accumulators to said actuators in either of two relations whereby to drive said other accumulator in either of opposite directions, said last-mentioned means including a second plate movable edgewise in one of said directions of movement of said first-mentioned plate and from a neutral position to control connection of said other accumulator in one of said relations thereof and movable in the opposite direction from said last-mentioned neutral position to control connection of said other accumulator in the other of said relations thereof; each of said plates having a slot therein extending substantially at right angles to the direction of movement thereof, said slots having relieved portions at different positions along the length thereof, means for yieldably maintaining said plates in their respective neutral positions, an actuating element movable in both of said slots, means for yieldably maintaining said actuating element in a neutral position wherein the latter may freely move along said slots at right angles to said directions of movement of said plates, means for effecting item entry operations including a device for moving said actuating element from said neutral position thereof and in one of said directions of movement of said plates; means for effecting total taking operations including a device for moving said actuating element from said neutral position thereof and in the other of said directions of movement of said plates; said actuating element being ineffective to actuate a said plate when in line with a said relieved portion thereof, and selectively settable means other than said aforementioned means for positioning said actuating element in different positions along said slots.

VALIA S. GOLEMON.

References Cited in the file of this patent

UNITED STATES PATENTS

| Number | Name | Date |
| --- | --- | --- |
| 1,833,467 | Mixer | Nov. 24, 1931 |
| 1,867,002 | Gardner | July 12, 1932 |
| 1,946,823 | Sundstrand | Feb. 13, 1934 |
| 2,141,269 | Ewald et al. | Dec. 27, 1938 |
| 2,147,692 | Crosman | Feb. 21, 1939 |
| 2,262,258 | Shipley et al. | Nov. 11, 1941 |
| 2,309,901 | Hogfors | Feb. 2, 1943 |